(12) United States Patent
Burton et al.

(10) Patent No.: US 7,493,418 B2
(45) Date of Patent: Feb. 17, 2009

(54) GENERIC METHOD FOR RESOURCE MONITORING CONFIGURATION IN PROVISIONING SYSTEMS

(75) Inventors: Toby L. Burton, Austin, TX (US); Rhonda L. Childress, Austin, TX (US); Liana Liyow Fong, Irvington, NY (US); Andrew Julius Greff, Stouffville (CA); Michael Husayn Kalantar, Millwood, NY (US); David George King, Oakville (CA)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 10/739,438

(22) Filed: Dec. 18, 2003

(65) Prior Publication Data

US 2005/0138164 A1  Jun. 23, 2005

(51) Int. Cl.
*G06F 15/173* (2006.01)

(52) U.S. Cl. ............... 709/724; 709/223; 709/225; 709/226

(58) Field of Classification Search .......... 709/223–226
See application file for complete search history.

(56) References Cited

U.S. PATENT DOCUMENTS

| 6,272,208 | B1 | 8/2001 | Kasrai | 379/15 |
| 6,460,082 | B1* | 10/2002 | Lumelsky et al. | 709/226 |
| 6,499,017 | B1 | 12/2002 | Feibelman et al. | 705/8 |
| 2002/0049803 | A1 | 4/2002 | Bandhole et al. | 709/104 |
| 2002/0169876 | A1 | 11/2002 | Curie et al. | 709/226 |
| 2002/0171678 | A1 | 11/2002 | Bandhole et al. | 345/744 |
| 2003/0051029 | A1* | 3/2003 | Reedy et al. | 709/224 |
| 2005/0102193 | A1* | 5/2005 | Day et al. | 705/26 |
| 2005/0132041 | A1* | 6/2005 | Kundu | 709/224 |

* cited by examiner

*Primary Examiner*—William C Vaughn, Jr.
*Assistant Examiner*—Maceeh Anwari
(74) *Attorney, Agent, or Firm*—Duke W. Yee; David A. Mims, Jr.; Gerald H. Glanzman (57) ABSTRACT

A generic mechanism and model are provided to capture and store configuration profiles for resource monitors such that monitors can be flexibly deployed, configured, modified, and removed using appropriate sets of parameters and values. As an integral part of resource provisioning, this generic mechanism will require only a generic set of workflows and a generic data model to provision monitors. The provisioning system of the present invention captures and stores response parameters and values from monitors created during initial deployment such that these parameters can be used for later modification and removal of these monitors.

7 Claims, 8 Drawing Sheets

| Resource Management | _ □ X |

Monitor specification: configuration parameters

Define Parameters
☐ This specification requires manual intervention to configure
(M)Description of manual intervention:

Add Parameter
  Name: [ ]   Caption: [ ]   Default: [ ]
Prompt [ ]   Min Length [ ]   Max Length [ ]   Data Type [Integer ▼]
⦿ Overrideable   ○ Must Override   ○ Manual Intervention   ○ Cannot Override
202 ⦿ Deployment    204 ○ Response    [Add Parameter]

| | Name | Caption | Default | Override Rule | Prompt | Min Len | Max Len | Data Type |
|---|---|---|---|---|---|---|---|---|
| ⦿ | ipaddr | ip addr | | Must Override | | 8 | 25 | text |
| ○ | | | | | | | | |

[Return to Specification]   [Cancel]   [Delete Parameter]

Port Checking Pattern Matching Monitor (PCPMM)
a. Parameters for monitor provisioning:
   i. Input: ip_address, port, retries, timeout, cycle time
   ii. Output: none
b. Parameters for monitor de-provisioning:
   i. Input: port
   ii. Output: none

*FIG. 5A*

MQ Monitor PAC (ITMMQ)
a. Parameters for monitor provisioning:
   i. Input: endpoint_label, definition_filename
   ii. Output: MQ_management_domain, profile_manager_label,
     MQ_Tmwk2Profile_name, MQ_Qmgr_object
b. Parameters for monitor de-provisioning:
   i. Input: MQ_management_domain, profile_manager_label,
     MQ_Tmw2kProfile_name, MQ_Qmgr_object
   ii. Output: none

*FIG. 5B*

Websphere Monitor PAC (ITMWS)
a. Parameters for monitor provisioning:
   i. Input: endpoint_label, nodename, fully_quality_host_name, itm_policy_region,
     os_type, admin_port_number, websphere_version, websphere_security_enabled,
     websphere_security_properties_file, websphere_install_path, app_server_name,
     has_web_module, has_ebj_module, adminserver_definition_filename,
     appserver_definition_filename, ws_fava_path
   ii. Output: ws_policy_region, adminserver_profile_manager,
     appserver_profile_manager, adminserver_tmw2kprofile, appserver_tmw2kprofile,
     adminserver_object_label
b. Parameters for monitor de-provisioning:
   i. Input: ws_policy_region, adminserver_profile_manager,
     appserver_profile_manager, adminserver_tmw2kprofile, appserver_tmw2kprofile,
     adminserver_object_label
   ii. Output: none

GENERIC METHOD FOR RESOURCE MONITORING CONFIGURATION IN PROVISIONING SYSTEMS

BACKGROUND OF THE INVENTION

1. Technical Field

The present invention relates to data processing systems and, in particular, to provisioning systems. Still more particularly, the present invention provides a method, apparatus, and program for resource monitoring configuration in provisioning systems.

2. Description of Related Art

Provisioning and automated provisioning (autoprovisioning or auto-provisioning) technologies are vital for an on-demand business model. An information technology (IT) organization, performs hardware and software deployment to meet the needs of the customer. For example, a customer may instruct the provisioning organization to add more servers at a particular date and time or at certain high workload conditions. As another example, a customer may instruct the provisioning organization to deploy encryption plug-ins or per-use billing software in addition to the existing software on the servers.

The process of provisioning resources can be very complex and may vary in many different aspects. The provisioning processes for each resource type may be different. Monitors are resources that provide information about other resources. For example, a monitor may be used to determine whether a switch is functional. A server may use a monitor to determine whether server resources are exhausted. Metering monitors are deployed on resources such that billing systems may use the monitored data created and collected. The set of monitors that should be provisioned depends on the other resources being provisioned and their context.

Each monitor has its own set of configuration parameters. For example, the parameters of a monitor used for communication are different from the parameters for a monitor used for a database software. The parameter set of a monitor may have a different value set when the monitor is applied to different resource types. For example, a monitor used for operating systems may have different parameter values for AIX operating and Linux operating systems. Even for the same monitor for the same resource type, the configuration parameters may require different values depending upon the resource usage in different environments such as customer environments. For example, the communication monitor will specify port numbers as a parameter. The parameter values of the port numbers may vary for different customer environments as different customers may use different ranges for their port numbers. Monitors may have different configuration parameters for any other reason as well.

Some monitors may require a set of response parameters to be saved for later use when modifying or removing the monitor. For example, the IBM Tivoli Monitoring (ITM) system will return the name of a management domain name when a server resource is initially configured to be monitored. The name of the management domain is later required as input to the ITM system in order to remove the monitoring of the server resource.

Currently, provisioning systems have limited capabilities in handling the complexity of resource monitor deployment and configuration during provisioning. Some systems provide mechanisms to execute deployment and configuration of resources using, for example, scripts. The same mechanisms can possibly be used to provision monitors. However, these mechanisms are not tailored to monitors. These systems expect provisioning administrators to provide the necessary scripts. The provisioning administrator would also then have to handle the complexity of monitors by providing different scripts and appropriate parameter values when deploying different instances of monitors of the different types and different instances of monitors of the same type but for different environments. A provisioning administrator has also the responsibility to store the output data from the deployment of monitors and then retrieve and used the data during the removal of the monitors.

SUMMARY OF THE INVENTION

The present invention provides a generic mechanism and model to capture and store configuration profiles for resource monitors such that monitors can be flexibly deployed, configured, modified, and removed using appropriate sets of parameters and values in provisioning systems. As an integral part of resource provisioning, this generic mechanism will require only a generic set of procedures or workflows and a generic data model to provision monitors. The present invention provides a generic capability to capture and store response parameters and values from monitors created during initial deployment such that these parameters can be used for later modification and removal of these monitors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
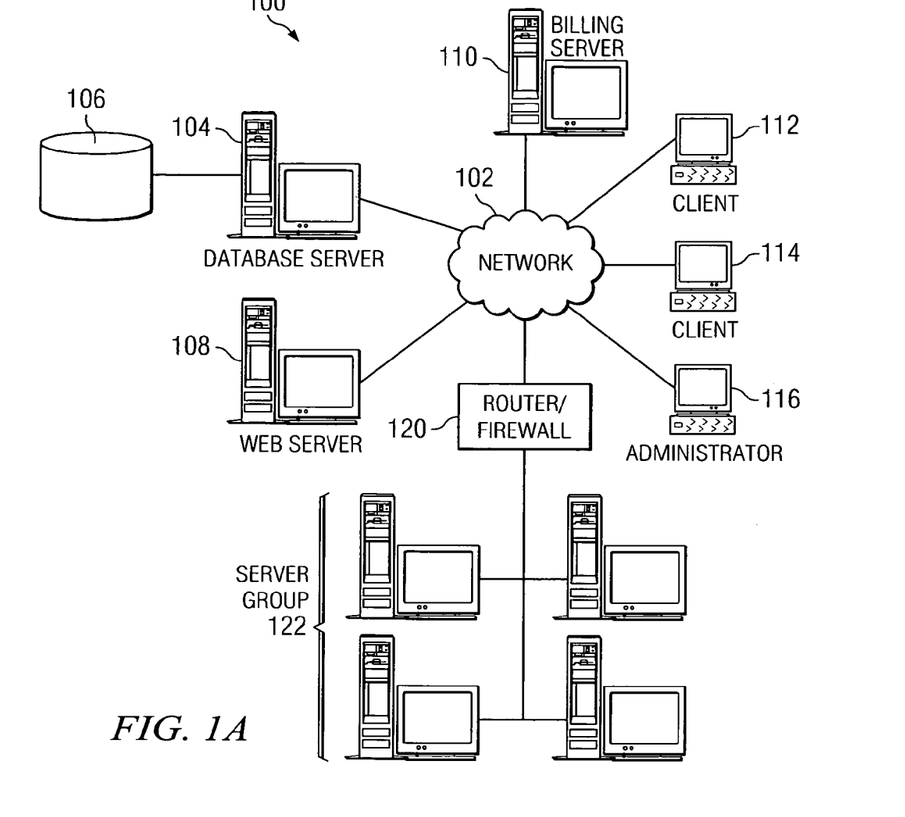
FIG. 1A depicts a pictorial representation of a network of data processing systems in which the present invention may be implemented.

With reference now to the figures, FIG. 1A depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, database server 104 is connected to network 102 and provides access to storage unit 106. Web server 108 and billing server 110 are also connected to network 102. Also, server group 122 is connected to the network through router/firewall 120. Database server 104, Web server 108, billing server 100, and server group 122 are examples of resources in network data processing system 100. In fact, the router itself, the firewall, and other hardware or software elements are also examples of resources that are part of network data processing system 100. These resources are also possible entities to be deployed and configured in the provisioning systems.

Computing resources included in an auto-provisioning system may be grouped into different types and specifications, with types having varying degrees of granularity, and each type may be associated with a set of attributes or specifications that are common to those resources. For example, the types of resources may be classified into server hardware, network hardware, storage hardware, operating system software, database middleware software, application software, and monitoring software. A resource type can further divide into sub-types, namely resource specifications. Examples of resource specifications of the server type including IBM series server specification and Sun Sparc server specification. Instances of a resource are resource entities, which are grouped by their resource specifications.

In addition, clients 112, 114, 116 are connected to network 102. These clients may be, for example, personal computers or network computers. In the depicted example, database server 104 provides data, such as boot files, operating system images, and applications to clients 112, 114, 116. Clients 112, 114, 116 are clients to server 104. Network data processing system 100 may include additional servers, clients, and other devices not shown.

Particularly, administrator client 116 is a client to be used by a provisioning administrator to define and provision resources in network data processing system 100. More particularly, a provisioning administrator may define and provision resource monitors within the network data processing system. Resource monitors may be used to monitor various hardware resources, such as server 104 and router 120, or software resources, such as for example a Web server application on Web server 108 or firewall software in router/firewall 120. Resource monitors may also be used to monitor a composition of resources, such as for example server group 122.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1A is intended as an example, and not as an architectural limitation for the present invention.

In accordance with a preferred embodiment of the present invention, a generic mechanism and model are provided to capture and store configuration profiles for resource monitors such that monitors can be flexibly deployed, configured, modified, and removed using appropriate sets of parameters and values. As an integral part of resource provisioning, this generic mechanism will require only a generic set of workflows and a generic data model to provision monitors.

Resource monitors may be either software entities or hardware devices that are used to monitor the attributes or states of resources. Resource monitors may themselves be categorized as resource instances of different resource specifications, or monitor specifications. Monitor specifications and information about monitor instances may be stored in a database in storage 106 via database server 104. Monitors have configuration profiles that may also be stored in the database. A configuration profile contains information used to provision, modify or remove a monitor. Using database for storage as an example does not preclude that the monitor specifications and configuration profiles can also be stored in other form of persistent storage such as a data file on a file system.

Figure 1B:
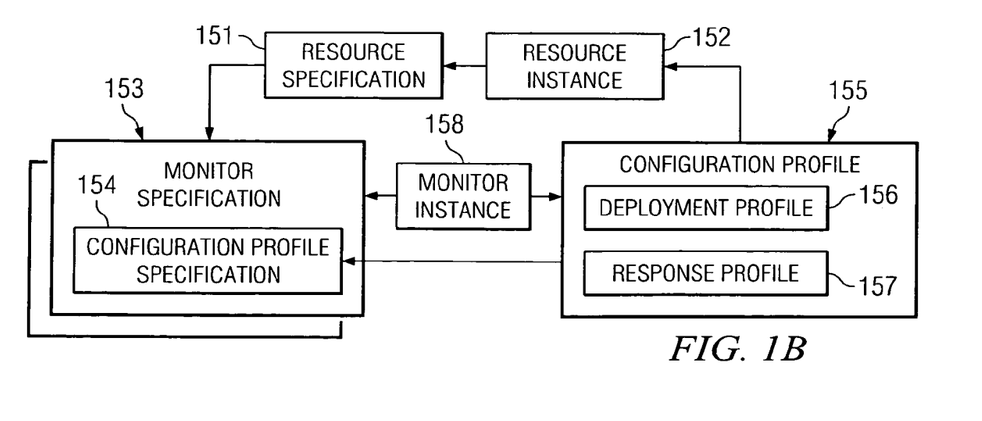
FIG. 1B depicts the relation of resource specifications, resource instances, monitor specifications and monitor instances and their configuration profiles in accordance with an exemplary embodiment of the present invention.

With reference to FIG. 1B, the administrator may access resource specifications 151 or resource instances 152 to identify the types of monitors; that is, monitor specifications 153, that should be used to monitor specific resource instances. The monitor specifications contain a configuration profile specification 154 that may be used to present parameters to an administrator, who, in turn, provides values for a specific monitor instance 158. These are used to create a monitor instance configuration profile 155 which may then be stored in the database in association with the corresponding resource instance.

A configuration profile contains parameters used for provisioning the monitor, the deployment profile 156. For some monitors, the deployment output parameters for provisioning the monitor on a resource may be used as input parameters for modifying the monitor, and removing the monitor during the resource de-provisioning cycle. Based on these observations and analyses, the mechanism of the present invention provides a generic approach to model, store and capture the monitor deployment output parameters and values. These response parameter/value pairs may also be stored in the monitor instance configuration profile as the response profile 157. When a monitor is to be modified or de-provisioned (removed), the administrator or the provisioning system may provide the parameter information for the specific monitor of interest.

Figure 2:
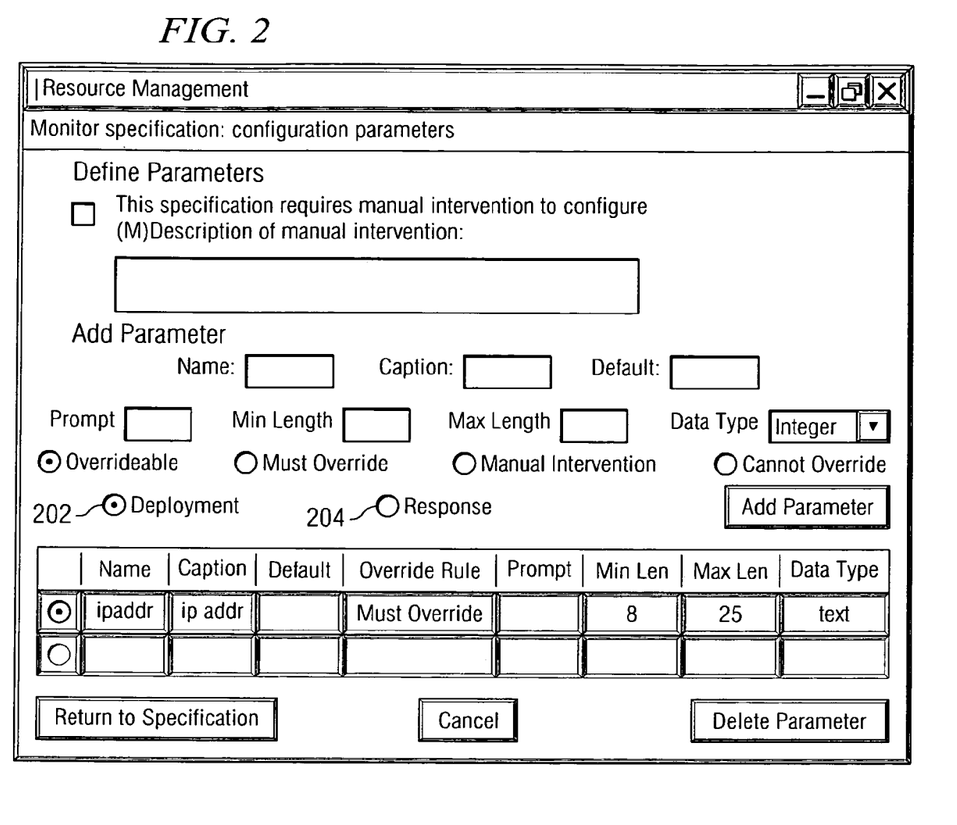
FIG. 2 depicts an example screen display for the system administration to define the monitor configuration parameters, including their names, name captions, default values if any, and attributes in accordance with a preferred embodiment of the present invention.

FIG. 2 depicts an example screen display for the system administrator to define the configuration profile specification 154, including their names, name captions, default values if any, and attributes. The detail of such example screen display is described in U.S. patent application Ser. No. 10/650,859, entitled "Generic method for defining resource configuration profiles in provisioning systems", which is hereby incorporated by reference.

In the preferred embodiment of the present invention, the techniques to capture the configuration Profile is similar to the above referenced patent; however, the configuration profiles for monitors must be enhanced to include not only a profile set of parameters and values for deployment, but also a profile set for response. The deployment configuration profile is used during the deployment of the monitors on resources to be monitored. The response profile will be used for modification of monitors and the removal of the monitors during re-provisioning of resources. Also, the output of the monitor deployment may be the necessary source of values for the parameters included in the response profile. When defining parameters in the configuration profile specification, the options should be selected to indicate they are for deployment 202 or for response 204.

Figure 3:
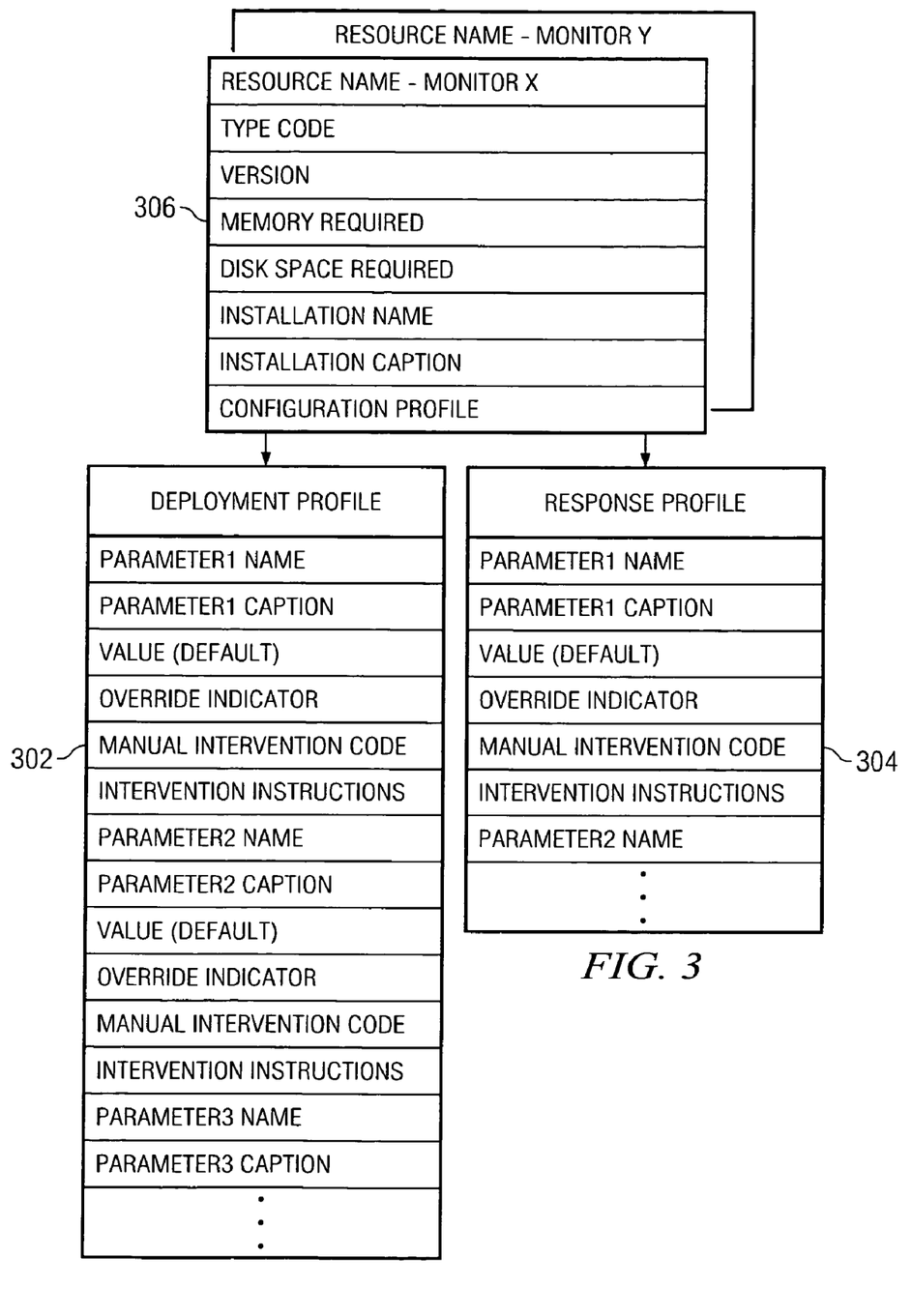
FIG. 3 depicts an exemplary information record layout of a monitor specification in accordance with a preferred embodiment of the present invention.

FIG. 3 depicts an exemplary information record layout of a monitor specification in accordance with a preferred embodiment of the present invention. The information can be stored in persistent storage such as a file on a file system or a database. Each monitor specification 306 contains information that applies to all instances of a particular monitor that may be deployed. These include, for example, the monitor name, the monitor type, the version, the memory and disk space required to support the monitor, an installation name and caption, and a configuration profile specification.

The configuration profile specification consists of a deployment parameter specification 302 and a response parameter specification 304. The deployment parameter specification 302 defines the list of parameters that must be defined for each instance of the monitor that will be deployed. For each parameter the following are defined: the parameter name, a caption used to describe the parameter, the default value of the parameter, and some attributes of the parameters such as an override indicator, a manual intervention code that indicates whether or not a manual process will be needed to define the parameter value and intervention instructions which define what must be done if the manual intervention is required. The override indicator indicates whether or not the default value must be changed, may be changed or cannot be changed. The response parameter specification 304 defines the parameters that are returned by the deployment. They are described using the same information as for the deployment parameter specification.

Figure 4:
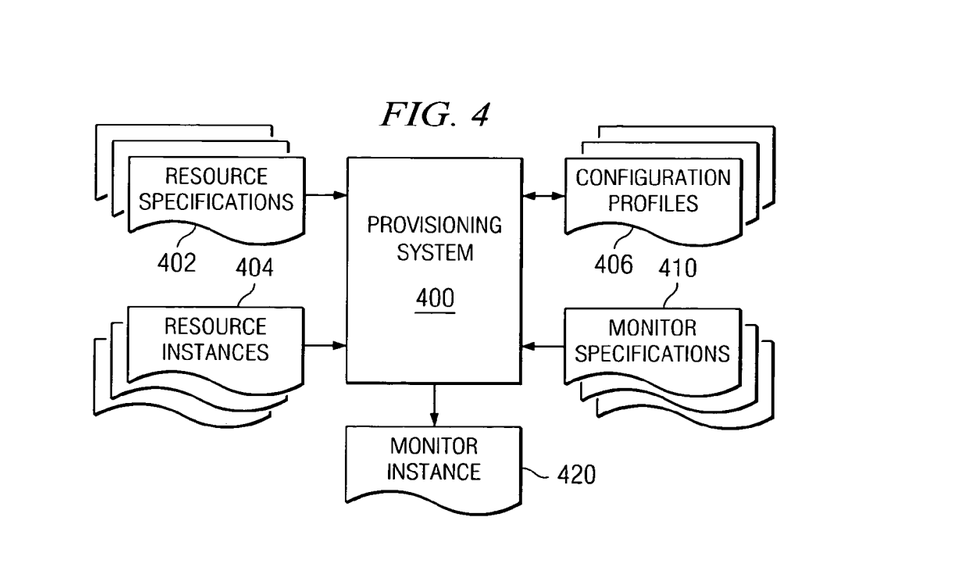
FIG. 4 is a block diagram illustrating a provisioning system in relation to resource monitoring in accordance with a preferred embodiment of the present invention.

With reference to FIG. 4, a block diagram illustrating a provisioning system is shown in accordance with a preferred embodiment of the present invention. Provisioning system 400 retrieves resource specifications 402 and resource instance information 404 from a database. The provisioning system also retrieves monitor specifications 410 from the database.

Provisioning system 400 may be software run on a client, such as a client device of a provisioning administrator. The administrator may operate provisioning system 400 to identify an appropriate monitor from resource specifications 402 and monitor specifications 410 by interacting with a graphical user interface (GUI), for example.

The provisioning system may then present the available monitors and their associated parameters using, for example, a graphical user interface. The administrator may then select the appropriate monitors for resources to be monitored and provide appropriate parameter values through the GUI to form monitor instance configuration profile 406.

To deploy a monitor instance 420 the provisioning system 400 retrieves the resource instance 404, monitor specifications 410 and configuration profile 406. The monitor instance is then provisioned using the parameter values defined in the configuration profile.

Figure 5A:
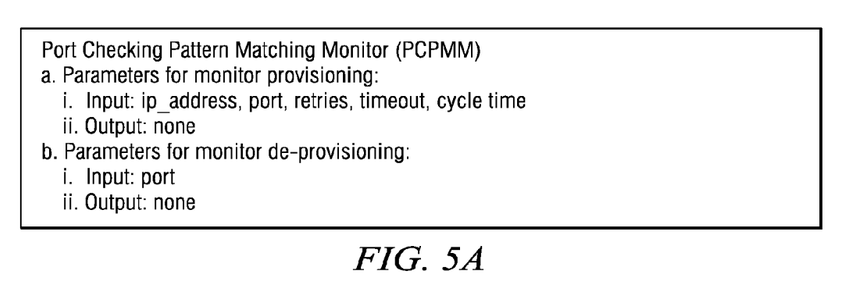
FIGS. 5A-5C illustrate data that may be contained within monitor specifications in accordance with a preferred embodiment of the present invention.
Figure 5B:
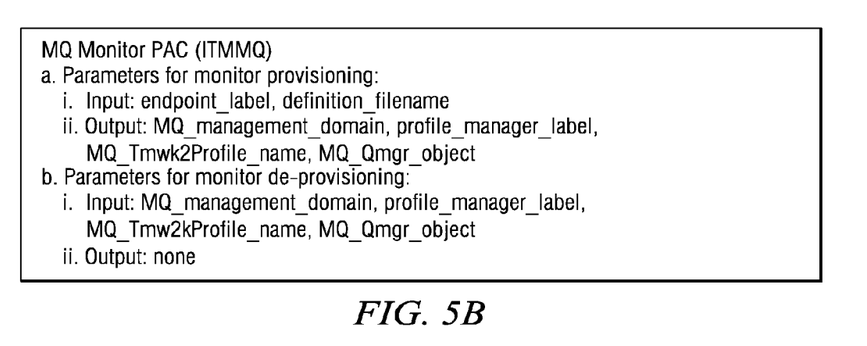
Figure 5C:
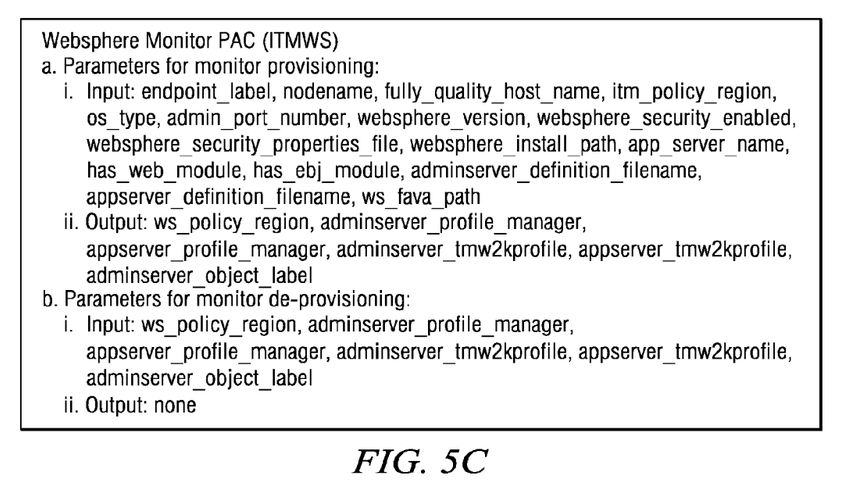

FIGS. 5A-5C illustrate data that may be contained within monitor specifications in accordance with a preferred embodiment of the present invention. More particularly, FIG. 5A illustrates a portion of data that may be contained within monitor specifications for a Port Checking Pattern Matching Monitor (PCPMM). FIG. 5A shows the parameters for monitor provisioning and the parameters for monitor de-provisioning. In this example, several input parameters are required for provisioning; however no output parameters are produced. Also, a single input parameter is required for de-provisioning.

FIG. 5B illustrates a portion of data that may be contained within monitor specifications for an IBM Tivoli Monitor for Messaging Queue software (ITMMQ). More specifically, FIG. 5B shows the parameters for monitor provisioning and the parameters needed for de-provisioning. FIG. 5C illustrates a portion of data that may be contained within monitor specifications for an IBM Tivoli Monitor for Websphere (IT-MWS).

The examples shown in FIGS. 5A-5C illustrate only parameters for monitor provisioning and parameters for monitor de-provisioning. However, other information may also be contained within monitor specifications, such as, for example, default values, whether a parameter can or cannot be overridden, whether a parameter must be overridden, or whether a parameter is manually intervention required. In the processes of deployment or removal a monitor, if a parameter indicates that manual intervention is required, a process or workflow would be initiated by the provisioning system to ask for the administrator to provide input while values for other parameters would be provided from the stored information in monitor specifications or instances.

Monitors may require many parameters to configure during the provisioning cycle. In the present embodiment, parameters used for provisioning can be references to other sources of information. In FIGS. 5B and 5C, both ITMMQ and ITMWS have a "definition_filename" as one of the provisioning parameters. The "definition_filename" is a reference to another data file containing more configuration information for the monitor and that configuration information is internal to the monitor and need not require support of provisioning workflows or procedures. The use "definition_filename" is optional and not a required feature.

Figure 6:
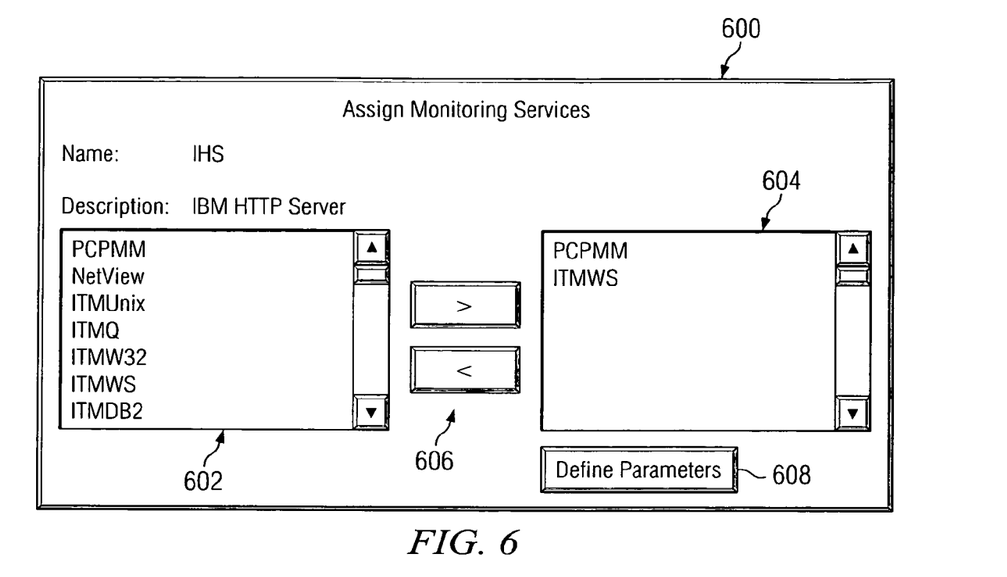
FIG. 6 depicts an example display screen for assigning monitors to resources in accordance with a preferred embodiment of the present invention.

With reference now to FIG. 6, an example display screen for assigning monitors is shown in accordance with a preferred embodiment of the present invention. Frame 600 presents an interface for assigning monitors to a resource. In the depicted example, a resource named "IHS" with a description of "IBM HTTP Server" is considered.

Monitors that may be assigned to the resource are displayed in display portion 602. Display portion 602 may be populated with every known monitor; however, in a preferred embodiment, the provisioning system populates the display portion with only those monitors that are applicable to the resource of interest. The user may select or deselect monitors from display portion 602 using buttons 606. Monitors that are selected for assignment appear in display portion 604. The user may then select a monitor in display portion 604 and initiate a configuration interface by selecting "Define Parameters" button 608.

Figure 7:
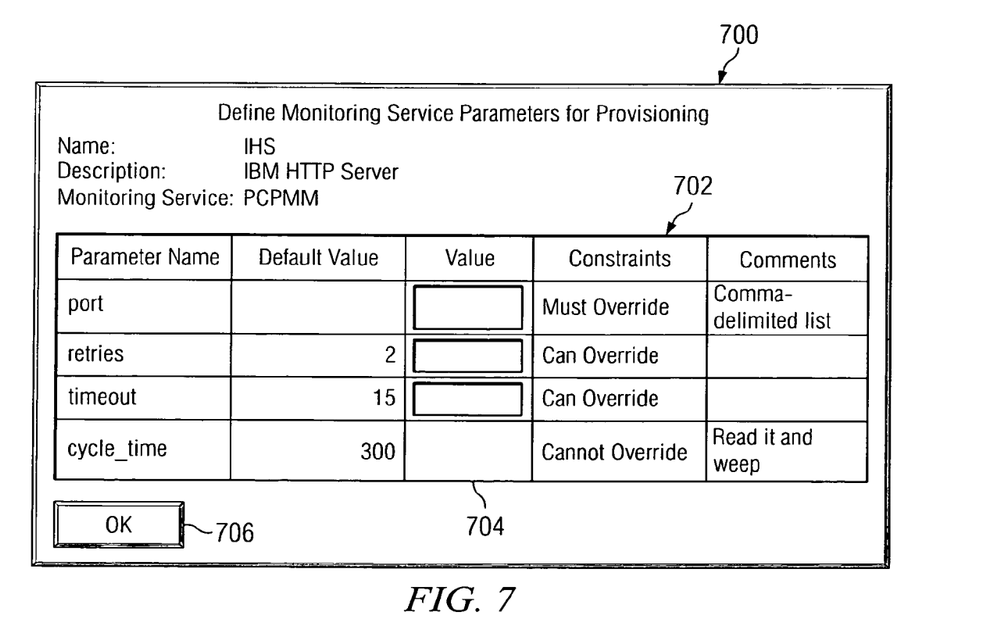
FIG. 7 depicts an example display screen for a configuration interface to assign values to parameters for monitor provisioning in accordance with a preferred embodiment of the present invention.

FIG. 7 depicts an example display screen for a configuration interface in accordance with a preferred embodiment of the present invention. Frame 700 presents an interface for defining monitoring parameter values for provisioning. In the depicted example, a resource named "IHS" with a description of "IBM HTTP Server" is being assigned monitor "PCPMM." The defined monitoring parameter values can be stored, for example, in a database as the monitor configuration profile.

Table 702 presents parameters for provisioning the PCPMM monitor. The table includes, for example, a column for parameter name, default value, value, constraints (or attributes), and comments. The parameter name, default value, constraints, and comments may be retrieved from the monitor specifications.

For parameters whose values can or must be overridden, the value column includes a value entry field 704. The administrator may then configure the monitor by specifying parameter values, if different from the default, in the value entry fields. When the administrator is finished configuring the monitor, the administrator may select "OK" button 706. A similar interface may be used to modify parameters for a monitor.

Figure 8:
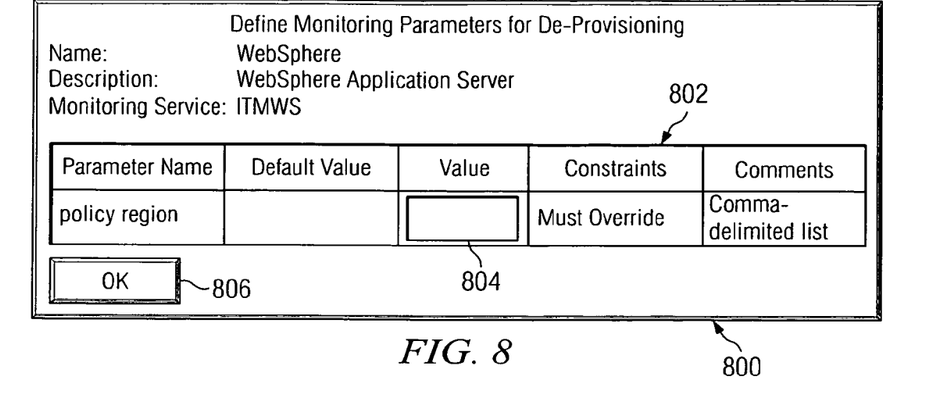
FIG. 8 depicts an example display screen for a configuration interface for assigning values to parameters for monitoring de-provisioning in accordance with a preferred embodiment of the present invention.

FIG. 8 depicts an example display screen for a configuration interface for response parameter values in accordance with a preferred embodiment of the present invention. Frame 800 presents an interface for defining monitoring parameter values for de-provisioning. In the depicted example, the monitor "ITMWS" for the resource named "WebSphere" with a description of "WebSphere Application Server" is being removed.

It is important to point out that it is not necessary to use the process of FIG. 8 in the case that the provisioning system has the intelligence to parse the output of the initial deployment of the monitors and save the values to the appropriate parameter fields.

Similar to the monitor configuration profiles containing a list of parameter/value pairs, the deployment output configuration profile may be stored as an array of parameter/value pairs for each monitor and for each resource on which the monitor is deployed. During the de-provisioning cycle of the monitors, the deployment output configuration profile may be used to de-provision the monitors appropriately.

Table 802 presents parameters for de-provisioning the PCPMM monitor. The table includes, for example, a column for parameter name, default value, value, constraints, and comments. The parameter name, default value, constraints, and comments may be received from the monitor specifications. In the depicted example, only one parameter is listed, because only one parameter is required for de-provisioning. For monitors that do not require de-provisioning parameters, an empty list of parameters and values is possible.

The value column includes a value entry field 804. The administrator may then specify the value for the port parameter by entering the value in entry field 804. When the administrator is finished specifying parameter values for the monitor, the administrator may select "OK" button 806 to save the response monitoring parameter values.

Figure 9:
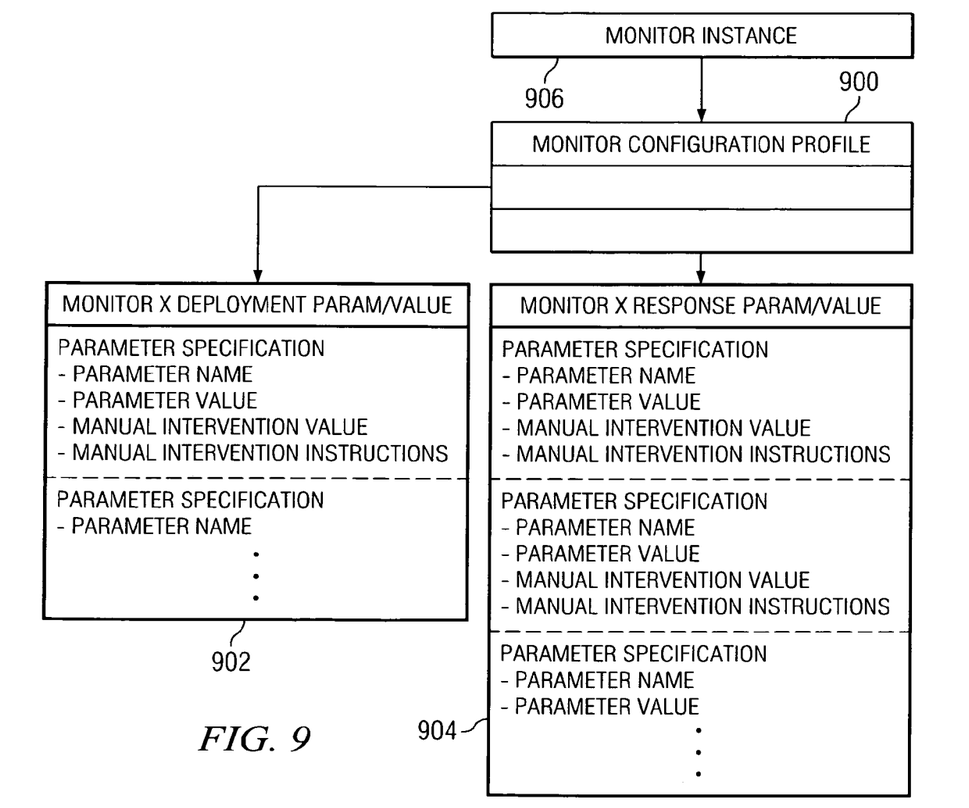
FIG. 9 depicts an exemplary relation of monitor, monitoring deployment and response parameters and values.

FIG. 9 depicts the relationship between a monitor instance and its configuration profile. The configuration profile defines the values of the parameters that are defined by the monitor specification. The monitor instance 906 refers to a configuration profile 900. This configuration profile is composed of a deployment profile 902 and a response profile 904. The deployment profile defines the values of each of the parameters needed to provision the monitor instance while the response profile contains the values of the parameters defined as a consequence of the provisioning of the monitor. For each parameter, the deployment profile 902 contains, for example, a reference to the deployment parameter specification 302, the name of the parameter, the value assigned to that parameter, a manual intervention value indicated whether or not manual intervention to define the parameter is required and manual intervention instructions. The response profile 904 contains the same information for each parameter. In this case, the reference is to a response parameter specification 304.

Figure 10A:
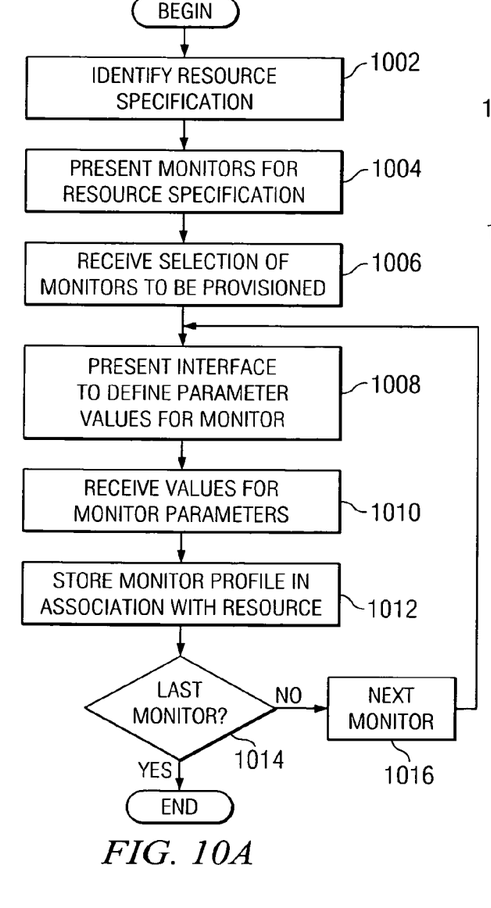
FIG. 10A is a flowchart illustrating the process to establish the association a resource specification and its monitors and their appropriate parameter sets.
Figure 10B:
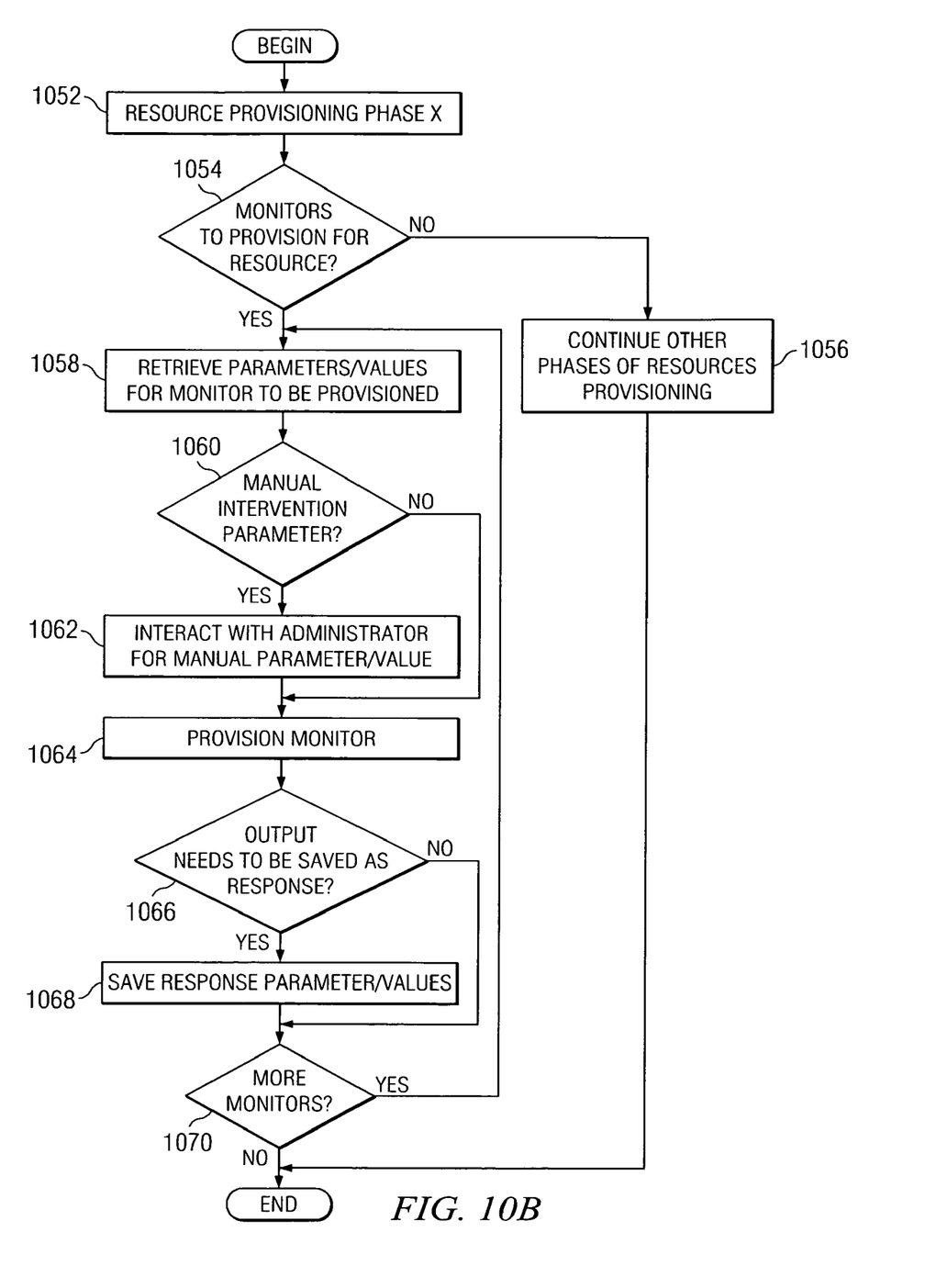
FIG. 10B is a flowchart illustrating the process of provisioning resource monitors in accordance with a preferred embodiment of the present invention.

Now, with reference to FIGS. 10A and 10B, flowcharts illustrating the process of provisioning resource monitors are shown in accordance with a preferred embodiment of the present invention. More particularly, FIG. 10A is a flowchart illustrating the operation of receiving and storing parameter values for monitors to be provisioned. The process begins and identifies a resource specification (step 1002). The resource specification may be identified by selection by a user. The process then presents monitors for the resource specification (step 1004) and receives a selection of monitors to be provisioned (step 1006), for example, using interface 600.

The process then presents an interface to define parameter values for a monitor (step 1008) and receives values for parameters for the monitor (step 1010), for example, using interfaces 700 and 800. These parameters can be both for provisioning and de-provisioning. The process stores a monitor configuration profile in association with the resource instance (step 1012) and a determination is made as to whether the monitor is the last monitor to be assigned to the resource (step 1014).

If the monitor is not the last monitor to be assigned, the process considers the next monitor (step 1016) and returns to step 1008 to present an interface to define parameters for the next monitor. However, if the monitor is the last monitor to be assigned in step 1014, the process ends.

FIG. 10B is a flowchart illustrating the workflow process of provisioning resources in accordance with a preferred embodiment of the present invention. The process begins and begins resource provisioning phase X (step 1052). A determination is made as to whether there are monitors to provision for a resource (step 1054). If there are no monitors to provision for the resource, the process continues other phases of resource provisioning (step 1056) and ends.

If there are monitors to provision for the resource in step 1054, the process retrieves parameters and values for the monitor to be provisioned (step 1058), for example, using a previously stored configuration profile A determination is made as to whether a manual intervention parameter exists (step 1060). If there is a manual intervention parameter, the process interacts with an administrator for manual parameter/value (step 1062) and the process provisions the monitor (step 1064). If the manual intervention provision does not exist, the process continues to step 1064 to provision the monitor.

Thereafter, a parse of deployment output can be used to make the determination as to whether output needs to be saved as a response (step 1066). If output needs to be saved, the process saves response parameter/values (step 1068). If output does not need to be saved in step 1066 or after the response parameter/values are saved in step 1068, a determination is made as to whether more monitors are to be provisioned for the resource (step 1070). If more monitors are to be provisioned, the process returns to step 1058 to retrieve parameters/values for the next monitor. If no more monitors are to be provisioned in step 1070, the process ends.

Figure 11:
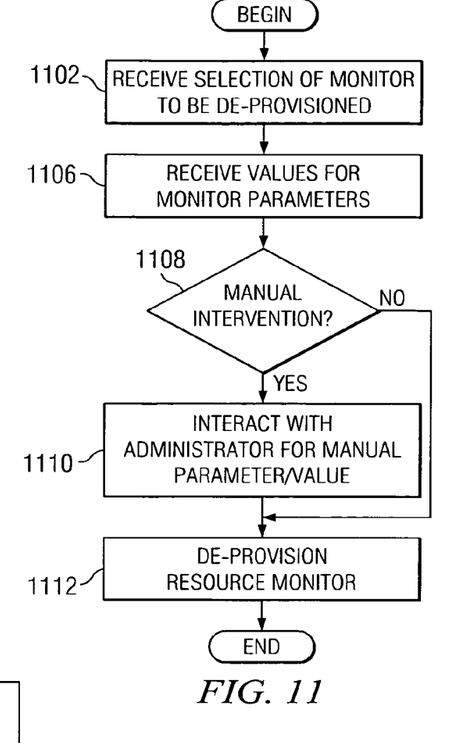
FIG. 11 is a flowchart illustrating the process of de-provisioning a resource monitor in accordance with a preferred embodiment of the present invention.

FIG. 11 is a flowchart illustrating the workflow process of de-provisioning a resource monitor in accordance with a preferred embodiment of the present invention. The process begins and receives a selection of a monitor to be de-provisioned (step 1102). Then, the process retrieves values for parameters for the monitor (step 1106). A determination is made as to whether a manual intervention parameter exists (step 1108). If there is a manual intervention parameter, the process interacts with an administrator for manual parameter/value (step 1110). Thereafter, the process de-provisions the resource monitor (step 1112) and ends.

Thus, the present invention solves the disadvantages of the prior art by providing a generic mechanism and model to capture and store configuration profiles for resource monitors such that monitors can be flexibly deployed, configured, modified, and removed using appropriate sets of parameters and values. As an integral part of resource provisioning, this generic mechanism will require only a generic set of workflows and a generic data model to provision monitors. The present invention provides a generic capability to capture and store response parameters and values from monitors created during initial deployment such that these parameters can be used for later modification and removal of these monitors.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for provisioning resource monitors, the method comprising:

providing at least one monitor specification, wherein a monitor specification includes a definition of parameters for a resource monitor, wherein the monitor specification includes both a deployment profile specification for deploying the resource monitor and a response profile specification for modifying and removing the resource monitor, wherein the deployment profile specification defines a list of parameters that must be defined to deploy each instance of the resource monitor and wherein the response profile specification defines parameters that are returned by deploying the resource monitor;

providing at least one resource specification, wherein a resource specification includes a definition of parameters that must be defined for each instance of a resource, wherein the resource is the resource to be monitored, and wherein the resource specification identifies a type of resource monitor to use for monitoring the resource that complies with the resource monitor;

associating the at least one monitor specification with the at least one resource specification to form at least one resource monitor instance configuration profile, wherein at least one instance of the resource monitor is assigned to at least one instance of the resource;

storing the at least one resource monitor instance configuration profile;

retrieving a resource monitor instance configuration profile for an instance of a given resource monitor assigned to an instance of a given resource;

receiving a selection of the given resource monitor to be provisioned for the instance of the given resource, wherein a monitor configuration profile is defined for the selection of the given resource monitor in association with the resource monitor instance configuration profile;

receiving at least one value for a parameter for the given resource monitor, wherein the monitor configuration profile includes the at least one value for a parameter;

storing the monitor configuration profile for the given resource monitor in association with the instance of the given resource; and deploying the given resource monitor in accordance with the monitor configuration profile.

2. The method of claim 1, wherein deploying the given resource monitor further comprises:

storing response parameters and values in the response profile specification.

3. The method of claim 2, further comprising:

de-provisioning the given resource monitor using the response parameters and values in the response profile specification.

4. The method of claim 1, wherein receiving at least one value for a parameter for the given resource monitor includes presenting an interface to define parameters for the given resource monitor based on a monitor specification for the given resource monitor.

5. The method of claim 1, wherein deploying the given resource monitor further comprises:

determining whether manual intervention is required for the given resource monitor based on a value of a parameter in the monitor configuration profile; and responsive to manual intervention being required for the given resource monitor, interacting with an administrator to receive at least one value for a parameter.

6. The method of claim 1, wherein deploying the given resource monitor further comprises:

capturing output parameters and values of a monitor deployment and storing them to the response profile specification.

7. The method of claim 1, wherein the instance of the given resource is a resource of a type selected from the group consisting of server hardware, network hardware, storage hardware, operating system software, database middleware software, application software, and monitoring software.

* * * * *